W. A. TURBAYNE.
DYNAMO ELECTRIC MACHINE.
APPLICATION FILED MAR. 17, 1913. RENEWED SEPT. 16, 1916.
1,223,449. Patented Apr. 24, 1917.
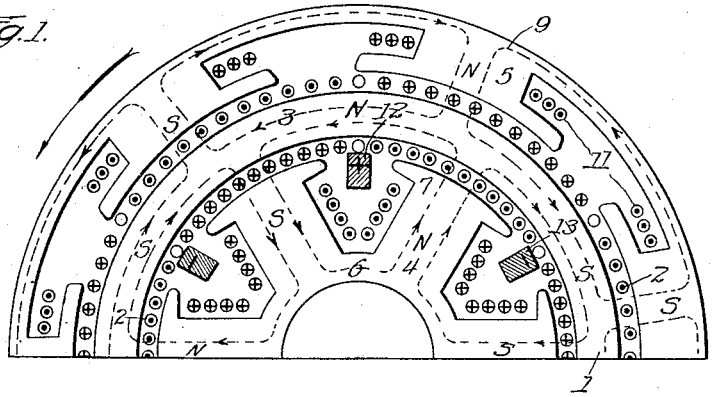
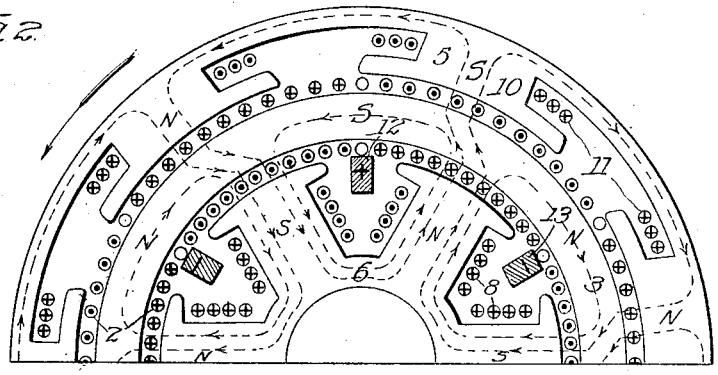
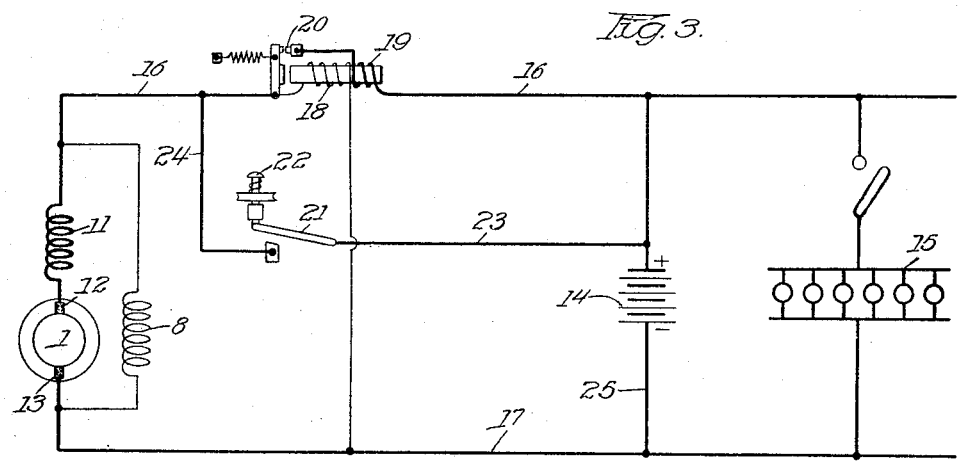
Witnesses:
Inventor.
William A. Turbayne
by Edwin B. H. Tower Jr. Atty.

UNITED STATES PATENT OFFICE.

WILLIAM A. TURBAYNE, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

DYNAMO-ELECTRIC MACHINE.

1,223,449. Specification of Letters Patent. Patented Apr. 24, 1917.

Application filed March 17, 1913, Serial No. 754,920. Renewed September 16, 1916. Serial No. 120,584.

*To all whom it may concern:*

Be it known that I, WILLIAM A. TURBAYNE, a citizen of the United States, residing at Niagara Falls, in the county of Niagara and State of New York, have invented new and useful Improvements in Dynamo - Electric Machines, of which the following is a full, clear, concise, and exact description, reference being had to the accompanying drawing, forming a part of this specification.

This invention relates to an improved dynamo electric machine.

In a copending application, Serial No. 738,629, filed December 26, 1912, there is described and claimed a novel form of dynamo electric machine provided with a ring-wound armature and with internal field poles producing a flux of uniform direction and magnitude. External field poles opposite each internal field pole act to set up a flux in the armature which aids the flux set up by the internal field poles when the machine acts as a motor and a high torque is desired. When the machine acts as a generator the external field, which is energized by series windings, is reversed and acts to divert flux from the armature core in proportion to any tendency to increase current in the external circuit and, consequently, the machine is self-regulating to a high degree.

In a machine of this character regulation does not depend on the differential action of the series windings in reducing the initial flux set up by the shunt winding but depends on the C. E. M. F. developed in the external armature conductors in passing through the flux diverted from the armature core and directed through the external field poles. The flux in the internal poles does not change in direction or magnitude, nor does the symmetry axis of the flux become altered since the tendency to distortion of the flux by reason of the armature currents will be substantially canceled. Thus, although the internal armature conductors will have a generator reaction tending to distort the flux in the direction of rotation, the outer armature conductors will have a motor reaction tending to distort the flux in the opposite direction so that commutation will be equally as good at the high speeds as at the low.

In any type of machine, however, assuming that the brushes are located at the geometrically neutral point, there is a sparking tendency when the machine is loaded on account of the flux set up in the armature core by the action of the armature currents, which flux is active in producing current in the coils short circuited by the brushes. In modern practice so-called interpoles or commutating poles are provided, wound and connected in such a manner that they not only oppose the flux produced by the armature windings but in fact contribute a flux in the right direction to produce an E. M. F. in the coils short circuited by the brushes in a direction to aid the reversal of current therein.

An object of the present invention is to provide a dynamo electric machine with improved means for counteracting the effects of armature current.

Another object of the invention is to provide an improved dynamo electric machine in which a single set of poles act both as regulating poles and commutating poles.

One embodiment of the invention is diagrammatically illustrated in the accompanying drawings, in which:

Figure 1 represents the dynamo electric machine when operating as a motor.

Fig. 2 represents the machine when operating as a generator.

Fig. 3 is a wiring diagram of the circuits when the machine is used as an automobile self-starter.

The improved dynamo electric machine comprises a rotatable armature 1 of the Gramme type, in which any suitable number of coils 2 completely encircle a laminated, or other form of ring, 3.

The field is provided with internal field poles 4 and external field poles 5.

The internal field poles 4 project from the circular yoke 6 and are provided with pole faces 7, closely adjacent the internal turns of the armature, and with windings 8.

The external field poles 5 project from a circular yoke 9 and are provided with pole faces 10, closely adjacent the external turns of the armature, and with windings 11.

Both external and internal poles are fixed and are arranged with an external pole corresponding to each internal pole. As illustrated in Figs. 1 and 2, each external pole is not exactly radially opposite its corresponding internal pole but is slightly shifted in the direction of rotation of the armature.

The armature conductors are connected to a commutator (not shown) in the usual manner. Positive brushes 12 and negative brushes 13 are adapted to bear on the commutator.

In Figs. 1 and 2 the magnetic flux is indicated by broken lines, the direction being indicated by the arrow heads. The direction of the current in the various conductors is indicated by crosses and dots, the crosses indicating that the current flows downward, in the direction away from the observer, and the dots indicating that the current flows upward, or toward the observer. The feathered arrows indicate the direction of rotation of the armature.

When the machine is operating as a motor and a high torque is desired, the external and internal fields are energized as indicated in Fig. 1 so that adjacent external and internal poles are of like polarity. Under this condition both external and internal turns of the armature will exert torque in the direction indicated by the feathered arrow.

The action of the armature current, as indicated in Fig. 1, is to produce a north pole in line with the positive brushes and a south pole in line with the negative brushes. By shifting the external poles, however, in the direction of rotation as illustrated, a portion of the pole will come directly over the brush and flux from the poles so located will act to neutralize the flux from the armature current in line with the brushes. As the outer poles are connected in series with the armature, current circulating around the outer poles will vary in the same sense as the armature current, and, consequently, irrespective of load conditions, the proper E. M. F. required to aid commutation will be developed in the coils short circuited by the brushes.

When the machine becomes a generator, as illustrated in Fig. 2, the armature current, and, consequently, the current around the external poles, is reversed. The action of the armature current, as indicated on Fig. 2, is to provide a south pole in line with the positive brushes and a north pole in line with the negative brushes. The external poles are, therefore, properly placed to set up a flux which opposes the flux from the armature current and which, accordingly, is in the proper direction to develop an E. M. F. in the coils short circuited by the brushes to bring about the desired sparkless commutation. As the outer poles are connected in series with the armature, the current flowing around these poles will vary in the same sense as the armature current and the sparkless commutation will continue regardless of variations in value of the current supplied to the external circuit.

As pointed out in application, Serial No. 738,629, above referred to, a machine of this character is adapted, among other uses, to be applied to automobile self-starting systems. In order to clearly illustrate the circuit connections preferable in this machine a diagrammatic representation of the circuit connections for an automobile self-starter has been shown in Fig. 3. As illustrated in Fig. 3, the internal field windings 8 are preferably connected in shunt across the generator brushes while the external field windings 11 are preferably connected in series with the armature. A battery 14 and lamps or other devices 15 are connected in parallel branches across the generator leads 16 and 17. An automatic switch of any suitable type is preferably provided in one of the generator leads. This switch is provided with a shunt closing coil 18 and a series holding coil 19, controlling contacts 20 which automatically connect and disconnect the generator and the battery, and lamps depending on the generator voltage.

An auxiliary starting switch 21 is controlled by a foot pedal or other device 22 and controls a motor circuit whereby current may be supplied from the battery to energize the dynamo electric machine as a motor for starting purposes.

When operating as a motor, therefore, current will be supplied by the battery 14 through conductor 23, switch 21, conductor 24, main lead 16, series field 11, positive brushes 12, armature 1, negative brushes 13, conductors 17 and 25 to the negative terminal of the battery. The shunt field coils 8 are also energized so that, as illustrated in Fig. 1, the shunt and series coils act together to produce a high torque in the motor for starting the engine.

When operating as a generator the manual switch is opened and the dynamo electric machine operates as a simple shunt wound generator until predetermined voltage is attained at which the automatic switch closes. The external and internal fields will now become energized, as illustrated in Fig. 2, and, although the generator speed may increase greatly, the generator will be automatically regulated to maintain the voltage within safe limits for charging the battery and supplying the lamps.

The circuits herein described are merely illustrative and the dynamo electric machine may be used in various relations where motors of variable speed and torque or generators of variable speed and voltage are required.

Under any such conditions, however, sparkless commutation is assured regardless of the varying conditions under which the machine is operated.

It is apparent that many modifications of the embodiment herein described may be made, all of which fall within the scope of the invention which is defined in the appended claims.

What I claim as new and desire to secure by Letters Patent is:

1. A dynamo electric machine provided with main field poles and regulating field poles, said regulating field poles acting to regulate the flux from said main field poles and being positioned to counteract the flux set up by the armature current.

2. A dynamo electric machine provided with a ring-wound armature, an external field structure and an internal field structure, said field structures being provided with pole pieces opposite each other, the polar faces of one set of field poles extending beyond the polar faces of the other set in the direction of rotation of the armature.

3. In a dynamo electric machine, a ring-wound armature, an external field yoke provided with poles, and an internal field yoke provided with poles, the poles of one yoke being slightly displaced angularly in the direction of rotation of the armature from the poles of the other yoke.

4. In a dynamo electric machine, a ring-wound armature, external field poles adjacent the outer periphery of said armature and internal field poles adjacent the inner periphery of said armature, each external pole being opposite an internal pole, and the polar faces of one set of poles extending beyond the polar faces of the other set of poles in the direction of rotation of the armature.

5. In a dynamo electric machine, a rotatable ring-wound armature, stationary field poles adjacent the outer periphery of said armature, and stationary field poles adjacent the inner periphery of said armature, one set of poles being angularly displaced in the direction of rotation of the armature from the poles of the other set.

6. An electric motor provided with a ring-wound armature, external field poles adjacent the outer periphery of said armature, and internal field poles adjacent the inner periphery of said armature, each external pole being opposite in position and of like polarity to an internal pole, the polar face of each external pole extending beyond the polar face of the opposite internal pole in the direction of rotation of the armature.

7. A dynamo electric machine provided with a ring-wound armature, fixed internal field poles with polar faces adjacent the internal armature conductors, brushes opposite the openings between said internal poles, and external poles opposite each internal pole, said external poles having polar faces extending over the armature turns short circuited by the brushes adjacent said external poles in the direction of rotation of the armature.

8. A dynamo electric machine provided with a ring-wound armature, fixed internal field poles with polar faces adjacent the internal armature conductors, fixed brushes opposite the spaces between said internal poles, external poles opposite each internal pole, said external poles having polar faces extending over the armature turns short circuited by the brushes adjacent said external poles in the direction of rotation of the armature, and means for energizing said external and internal poles so that adjacent external and internal poles are of like polarity, whereby outer and inner armature conductors may exert torque in the same direction and whereby the flux in the armature, due to armature current, is neutralized.

9. An electric motor provided with a ring-wound armature, an external field yoke provided with poles adjacent the outer periphery of said armature, an internal field yoke provided with poles adjacent the inner periphery of said armature, said external poles being slightly displaced in the direction of rotation of the armature with respect to said internal poles, windings in series with the armature on said external poles, and windings connected across the motor leads on said internal poles, said windings being so connected that adjacent external and internal poles are of like polarity, whereby outer and inner turns of the armature conductor may exert torque in the same direction and flux set up by the armature current may be neutralized.

10. A generator provided with a ring-wound armature, external field poles adjacent said armature, and internal field poles adjacent said armature, adjacent external and internal poles being of opposite polarity, the polar faces of one set of poles extending beyond the polar faces of the other set in the direction of rotation of the armature.

11. A self-regulating variable speed generator provided with a ring-wound armature, external field poles adjacent said armature, internal field poles adjacent said armature, an external pole being opposite in position to each internal pole, and means for energizing said poles so that adjacent external and internal poles are of opposite polarity, the polar faces of one set of poles extending beyond the polar faces of the other set in the direction of rotation of the armature.

12. A self-regulating variable speed generator provided with a ring-wound armature, an external field yoke provided with poles adjacent the outer periphery of said armature, an internal field yoke provided with poles adjacent the inner periphery of said armature, each external pole being adjacent an internal pole but displaced therefrom through a small angle in the direction of rotation of the armature, windings in shunt to the generator on the internal poles, and windings in series with the generator on the external poles, said windings being so connected that adjacent external and internal poles are of opposite polarity, whereby an E. M. F. generated in the outer armature turns will oppose the E. M. F. generated in the inner armature turns, and whereby the flux set up by the armature current will be neutralized.

13. A variable speed generator provided with a ring-wound armature, external field poles, and an oppositely energized internal field pole opposite each external field pole, each external field pole being slightly displaced in the direction of rotation of the armature with respect to its opposite internal field pole, whereby tendency to field distortion caused by the inner armature turns will be counteracted by that caused by the outer armature turns, and whereby the external field poles will create a flux neutralizing the flux caused by the armature current, thereby avoiding sparking at the brushes.

14. A self-regulating variable speed generator having a ring-wound armature, a shunt field winding creating a flux cut by the inner turns of said armature, and a series field winding diverting flux from said armature, said diverted flux being cut by the outer turns of said armature, whereby said outer turns set up an E. M. F. opposed to that set up by said inner turns, said series field winding being positioned to oppose flux created by the armature current.

In witness whereof, I have hereunto subscribed my name in the presence of two witnesses.

WILLIAM A. TURBAYNE.

Witnesses:
E. R. KING,
R. H. VAN NEST.

Copies of this patent may be obtained for five cents each, by addressing the "Commissioner of Patents, Washington, D. C."